US009691322B2

(12) United States Patent
Hwang

(10) Patent No.: US 9,691,322 B2
(45) Date of Patent: Jun. 27, 2017

(54) OLED DISPLAY DEVICE COMPENSATING IMAGE DECAY

(71) Applicant: Shenzhen China Star Optoelectronics Technology Co., Ltd., Shenzhen, Guangdong (CN)

(72) Inventor: Tai-jiun Hwang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/860,811

(22) Filed: Sep. 22, 2015

(65) Prior Publication Data

US 2016/0012770 A1 Jan. 14, 2016

Related U.S. Application Data

(62) Division of application No. 13/697,955, filed on Nov. 14, 2012, now Pat. No. 9,171,494.

(51) Int. Cl.

| | |
|---|---|
| ***G06F 3/038*** | (2013.01) |
| ***G09G 3/3208*** | (2016.01) |
| ***G09G 3/20*** | (2006.01) |

(52) U.S. Cl.

CPC ............. *G09G 3/3208* (2013.01); *G09G 3/20* (2013.01); *G09G 2320/043* (2013.01); *G09G 2320/0693* (2013.01); *G09G 2360/145* (2013.01); *G09G 2360/16* (2013.01)

(58) Field of Classification Search

CPC .. G09G 3/30; G09G 3/36; G09G 5/00; G09G 5/10; G06F 3/038; G06F 3/048; G11C 19/00

USPC ..................................................... 345/76–78

See application file for complete search history.

(56) References Cited

U.S. PATENT DOCUMENTS

2007/0052633 A1* 3/2007 Sato ...................... G09G 3/006 345/76
2008/0074358 A1* 3/2008 Ogawa ................ G09G 3/3233 345/76
2010/0302214 A1* 12/2010 Kim ........................ G09G 3/20 345/204
2014/0055500 A1* 2/2014 Lai ...................... G09G 3/3208 345/690

FOREIGN PATENT DOCUMENTS

| | | |
|---|---|---|
| CN | 101044541 A | 9/2007 |
| CN | 101123066 A | 2/2008 |
| CN | 101739951 A | 6/2010 |

* cited by examiner

*Primary Examiner* — Pegeman Karimi
(74) *Attorney, Agent, or Firm* — Andrew C. Cheng

(57) ABSTRACT

An OLED display device includes a display screen, a sensor, and a timing controller. The timing controller includes a detection unit, a test image generation unit, a data compensation unit, and image control unit. The detection unit provides a command for generating a test image. The test image generation unit generates a test image according to the command. The data compensation unit receives a decayed signal that corresponds to the test image and is detected by the sensor in order to generate a compensation signal according to the decayed signal. In response to the compensation signal, the image control unit compensates an external image to achieve normal displaying of the external image on the display screen.

6 Claims, 7 Drawing Sheets

OLED DISPLAY DEVICE COMPENSATING IMAGE DECAY

CROSS REFERENCE TO RELATED APPLICATIONS

This is a divisional application of co-pending patent application Ser. No. 13/697,955, "OLED Display Device Compensating Image Decay", filed on Nov. 14, 2012.

BACKGROUND OF THE INVENTION

1. Field of the Invention

The present invention relates to the field of displaying techniques, and in particular to an OLED display device and control method thereof.

2. The Related Arts

Currently, organic light-emitting diode (OLED) is widely applied to various display device because of the advantages of fast response, light weight, thin, simple structure and low cost. However, OLED display device often shows uneven situation because of the variable factor of the light-emitting material. In addition, the uneven display situation will decay as the drive time and greatly affect the display quality.

SUMMARY OF THE INVENTION

The technical issue to be addressed by the present invention is to provide an OLED display device and control method thereof, able to improve the deteriorated uneven display as the time passes.

The present invention provides an OLED display device, which comprises: a display screen, a sensor and a timing controller, wherein the display screen being configured to display image, the sensor being configured to inspect decayed signal of the display screen when displaying, and the timing controller comprising a detection unit, an external image receiving unit, a test image generation unit, a selection unit, a data compensation unit and image control unit; wherein the detection unit being configured to provide command for generating test image; the external image receiving unit being configured to receive external image; the test image generation unit being configured to generate test image according to the command for generating test image, the selection unit being configured to select test image input when receiving command for generating test image, or to select external image input when not receiving command for generating test image, and then to transmit the input test image or external image to the image control unit, the image control unit being configured to transmit test image to the display screen for detecting decay of display screen when inputting test image; and the data compensation unit being configured to obtain decayed signal corresponding to test image detected by the sensor and to generate compensation signal to transmit to the image control unit according to the decayed signal; when the image control unit inputting external image, the external image being compensated according to the compensation signal so that the external image able to display normally in the display screen; wherein the detection unit comprising a power-on detection unit, the power-on detection unit being configured to provide command for generating test image when the OLED display device turned on; the decayed signal being a voltage signal or a current signal, the data compensation unit storing in advance standard voltage signal or standard current signal corresponding to the test image before inputting to display screen, then after the test image inputted to display screen, using the sensor to detect the decayed voltage signal or decayed current signal corresponding to the test image, and determining the value of compensation signal according to the difference between the standard voltage signal and decayed voltage signal or the difference between the standard current signal and decayed current signal.

According to a preferred embodiment of the present invention, the detection unit further comprises a timer unit and a storage unit, wherein the storage unit stores default time and the timer unit obtains the default time and provides command for generating test image based on the default time.

According to a preferred embodiment of the present invention, the detection unit further comprises an external activation unit, and the external activation unit provides command for generating test image after receiving instructions inputted by a user.

According to a preferred embodiment of the present invention, the image control unit further comprises an image duration control unit, and when inputting external image, the image duration control unit controls duration of each frame of the external image when entering display screen based on the compensation signal.

According to a preferred embodiment of the present invention, the image control unit further comprises a voltage generation unit, and when inputting external image, the voltage generation unit generates control voltage of external image based on compensation signal and transmits the control signal to display screen.

The present invention provides an OLED display device, which comprises: a display screen, a sensor and a timing controller, wherein the display screen being configured to display image, the sensor being configured to inspect decayed signal of the display screen when displaying, and the timing controller comprising a detection unit, an external image receiving unit, a test image generation unit, a selection unit, a data compensation unit and image control unit; wherein the detection unit being configured to provide command for generating test image; the external image receiving unit being configured to receive external image; the test image generation unit being configured to generate test image according to the command for generating test image, the selection unit being configured to select test image input when receiving command for generating test image, or to select external image input when not receiving command for generating test image, and then to transmit the input test image or external image to the image control unit, the image control unit being configured to transmit test image to the display screen for detecting decay of display screen when inputting test image; and the data compensation unit being configured to obtain decayed signal corresponding to test image detected by the sensor and to generate compensation signal to transmit to the image control unit according to the decayed signal; when the image control unit inputting external image, the external image being compensated according to the compensation signal so that the external image able to display normally in the display screen.

According to a preferred embodiment of the present invention, the detection unit further comprises a power-on detection unit, and the power-on detection unit is configured to provide command for generating test image when the OLED display device is turned on.

According to a preferred embodiment of the present invention, the detection unit further comprises a timer unit and a storage unit, wherein the storage unit stores default time and the timer unit obtains the default time and provides command for generating test image based on the default time.

According to a preferred embodiment of the present invention, the detection unit further comprises an external activation unit, and the external activation unit provides command for generating test image after receiving instructions inputted by a user.

According to a preferred embodiment of the present invention, the decayed signal is a voltage signal or a current signal, the data compensation unit stores in advance standard voltage signal or standard current signal corresponding to the test image before inputting to display screen, then after the test image inputted to display screen, uses the sensor to detect the decayed voltage signal or decayed current signal corresponding to the test image, and determines the value of compensation signal according to the difference between the standard voltage signal and decayed voltage signal or the difference between the standard current signal and decayed current signal.

According to a preferred embodiment of the present invention, the image control unit further comprises an image duration control unit, and when inputting external image, the image duration control unit controls duration of each frame of the external image when entering display screen based on the compensation signal.

According to a preferred embodiment of the present invention, the image control unit further comprises a voltage generation unit, and when inputting external image, the voltage generation unit generates control voltage of external image based on compensation signal and transmits the control signal to display screen.

The present invention provides a control method of OLED display device, the OLED comprising a display screen, the control method comprises the steps of: providing command for generating test image; generating test image according to command for generating test image; transmitting test image to display screen to detect the decay of the display screen; detecting decayed signal corresponding to the test image in the display screen; generating compensation signal according to the decayed signal; compensating external image according to the compensation signal; and displaying compensated external image.

According to a preferred embodiment of the present invention, the command for generating test image is provided when the OLED display device is turned on.

According to a preferred embodiment of the present invention, a default time is preset and stored, and the command for generating test image is provided according to the default time.

According to a preferred embodiment of the present invention, a test is performed to determine whether instruction inputted by a user, and if so, the command for generating test image is provided.

According to a preferred embodiment of the present invention, before the step of transmitting test image to display screen to detect the decay of the display screen, the method further comprises a step of storing in advance standard voltage signal or standard current signal corresponding to test image; the step of detecting decayed signal corresponding to the test image in the display screen further comprises: detecting decayed voltage signal or decayed current signal corresponding to test image in display screen; and the step of generating compensation signal according to the decayed signal further comprises: determining the value of compensation signal according to the difference between the standard voltage signal and the decayed voltage signal, or the difference between the standard current signal and the decayed current signal.

The efficacy of the present invention is that to be distinguished from the state of the art. The present invention disposes detection unit to provide command for generating test image, provides test image to detect the decay in displayed image in real time and generates corresponding compensation signal to compensate external image to remove the impact of decay to improve display quality. The present invention also provides a control method of OLED display device so that the present invention can compensate external image in real time according to command for generating test image and to improve the uneven display situation caused by decay of OLED display device as time passes.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
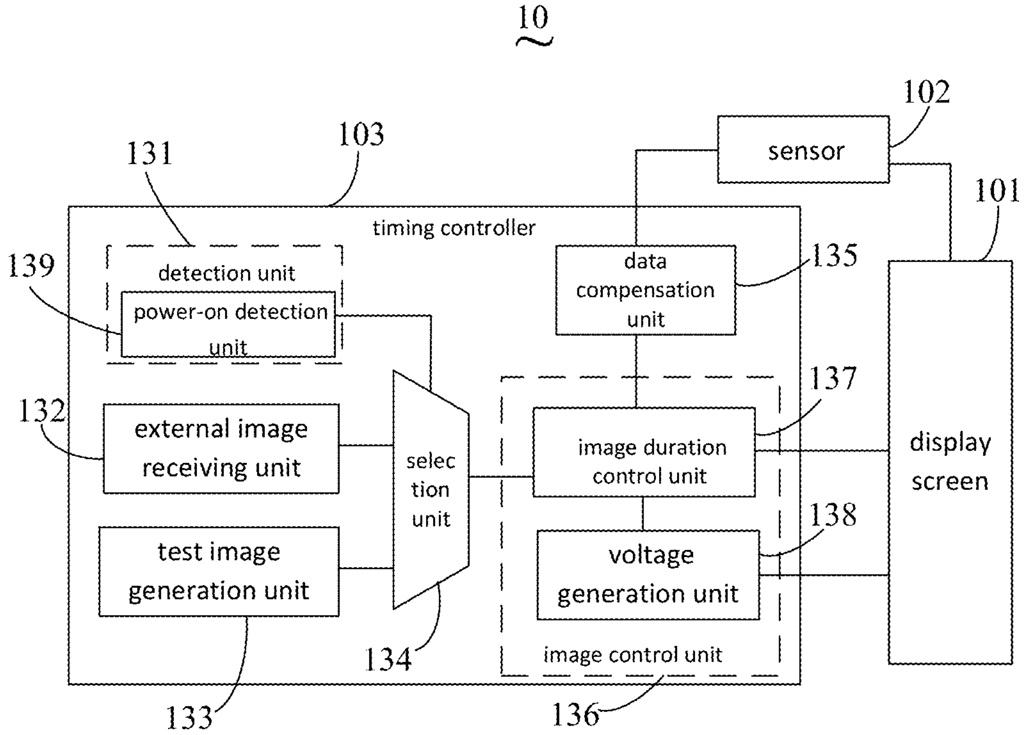
FIG. 1 is a schematic view showing the structure of the first embodiment of an OLED display device according to the present invention.

Referring to FIG. 1, FIG. 1 is a schematic view showing the structure of the first embodiment of an OLED display device according to the present invention. As shown in FIG. 1, an OLED display device 10 of the present invention comprises a display screen 101, a sensor 102 and a timing controller 103.

In the instant embodiment, the sensor 102 is connected respectively to the display screen 101 and the timing controller 103, and the timing controller 103 is further connected to the display screen 101, wherein the display screen 101 is configured to display image, the sensor 102 is configured to inspect decayed signal of the display screen 101 when displaying, and the timing controller 103 is configured to control normal display of the display screen 103 and comprises a detection unit 131, an external image receiving unit 132, a test image generation unit 133, a selection unit 134, a data compensation unit 135 and image control unit 136.

In the instant embodiment, the detection unit 131, the external image receiving unit 132 and the test image generation unit 133 are connected respectively to the selection unit 134. The selection unit 134 is further connected to image control unit 136. The image control unit 136 is further connected to display screen 101 and data compensation unit 135. The data compensation unit 135 is further connected to the sensor 102.

In the instant embodiment, the detection unit 131 is configured to provide command for generating test image; the external image receiving unit 132 is configured to receive external image; the test image generation unit 133 is configured to generate test image according to the command for generating test image, the selection unit 134 is configured to select test image input when receiving command for generating test image, or to select external image input when not receiving command for generating test image, and then to transmit the input test image or external image to the image control unit 136; and the image control unit 136 is configured to transmit test image to the display screen 101 for detecting decay of display screen 101 when inputting test image. The data compensation unit 135 is configured to obtain decayed signal corresponding to test image detected by the sensor 102 and to generate compensation signal to transmit to the image control unit 136 according to the decayed signal, wherein the decayed signal is a voltage signal or current signal.

Specifically, the data compensation unit 135 stores in advance standard voltage signal or standard current signal corresponding to the test image before inputting to display screen 101. Then, after the test image inputted to display screen 101, the sensor 102 is used to detect the decayed voltage signal or decayed current signal corresponding to the test image. Finally, the data compensation unit 135 determines the value of compensation signal according to the difference between the standard voltage signal and decayed voltage signal or the difference between the standard current signal and decayed current signal.

When the image control unit 136 inputs external image, the external image is compensated according to the compensation signal so that the external image is able to display normally in the display screen 101.

Specifically, the image control unit 136 further comprises an image duration control unit 137 and a voltage generation unit 138, wherein image duration control unit 137 is connected respectively to selection unit 134, compensation unit 135, display screen 101 and voltage generation unit 138. The voltage generation unit 138 is further connected to display screen 101.

In the instant embodiment, when inputting external image, based on the size of compensation signal provided by compensation unit 135, the image duration control unit 137 controls duration (that is, frequency) of each frame of the external image when entering display screen 101. The image duration control unit 137 further transmits the external image signal and the compensation signal to voltage generation unit 138. The voltage generation unit 138, based on the external image signal and the compensation signal, generates a control voltage of external image and transmits the control voltage to display screen 101. Therefore, the image duration control unit 137 and the voltage generation unit 138 commonly control the external image according to the compensation signal so that the external image is displayed normally in display screen 101.

It should be noted that when the image duration control unit 137 inputs test image, the image duration control unit 137 transmits the test image directly to display screen 101 and also transmits the signal of test image to the voltage generation unit 138. The voltage generation unit 138, based on the test image signal, generates a corresponding control voltage and transmits the control voltage to display screen 101. It should be noted that the control voltage generated by the voltage generation unit 138 is not a voltage to compensate the test image, but a voltage to control whether the display screen 101 to display the test image.

In the instant embodiment, the detection unit 131 further comprises a power-on detection unit 139. The power-on unit 139 is connected to selection unit 134. The power-on detection unit 139 is configured to provide command for generating test image when the OLED display device 10 is turned on so that the OLED display device 10 can generate a test image whenever the OLED display device 10 is turned on to detect the decay of the OLED display device 10. Therefore, the external image can be compensated in real time and the uneven display situation caused by decay of the OLED display device 10 as time passes can be improved.

Figure 2:
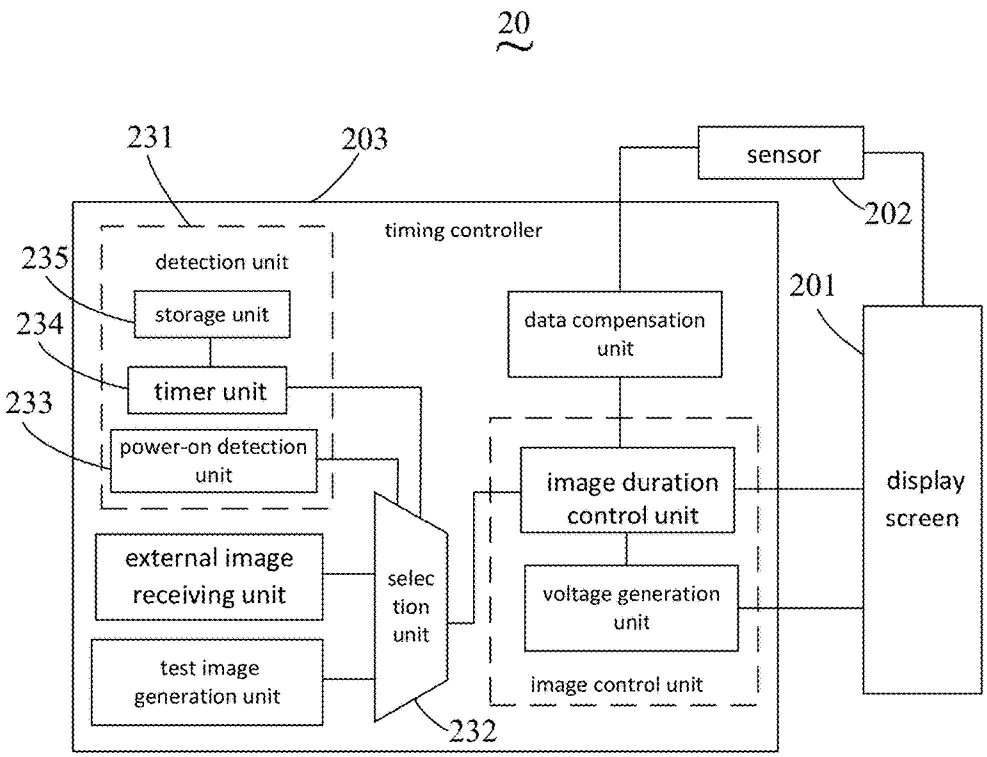
FIG. 2 is a schematic view showing the structure of the second embodiment of an OLED display device according to the present invention.

Referring to FIG. 2, FIG. 2 is a schematic view showing the structure of the second embodiment of an OLED display device according to the present invention. The difference between the OLED display device 20 and the OLED display device 10 of FIG. 1 is that the OLED display device 20 of FIG. 2 further comprises a timer unit and a storage unit.

As shown in FIG. 2, the OLED display device 20 still comprises a display screen 201, a sensor 202 and a timing controller 203. The timing controller 203 comprises a detection unit 231 and selection unit 232, wherein the detection unit 231, in addition to power-on detection unit 233, also comprises a timer unit 234 and a storage unit 235, wherein the timer unit 234 is connected respectively to the storage unit 235 and selection unit 232.

In the instant embodiment, the storage unit 235 stores a default time and the timer unit 234 obtains the default time from the storage unit 235 and provides command for generating test image based on the default time, wherein the default time is set during design or manufacturing the OLED display device 20 according to the requirement.

Therefore, the OLED display device 20 of the present embodiment not only provides test image when turned on, but also can provide test image according to the default time after turned on to re-detect the decay of OLED display device 20. Therefore, the external image can be compensated in real time and the uneven display situation caused by decay of the OLED display device 20 as time passes can be improved.

Figure 3:
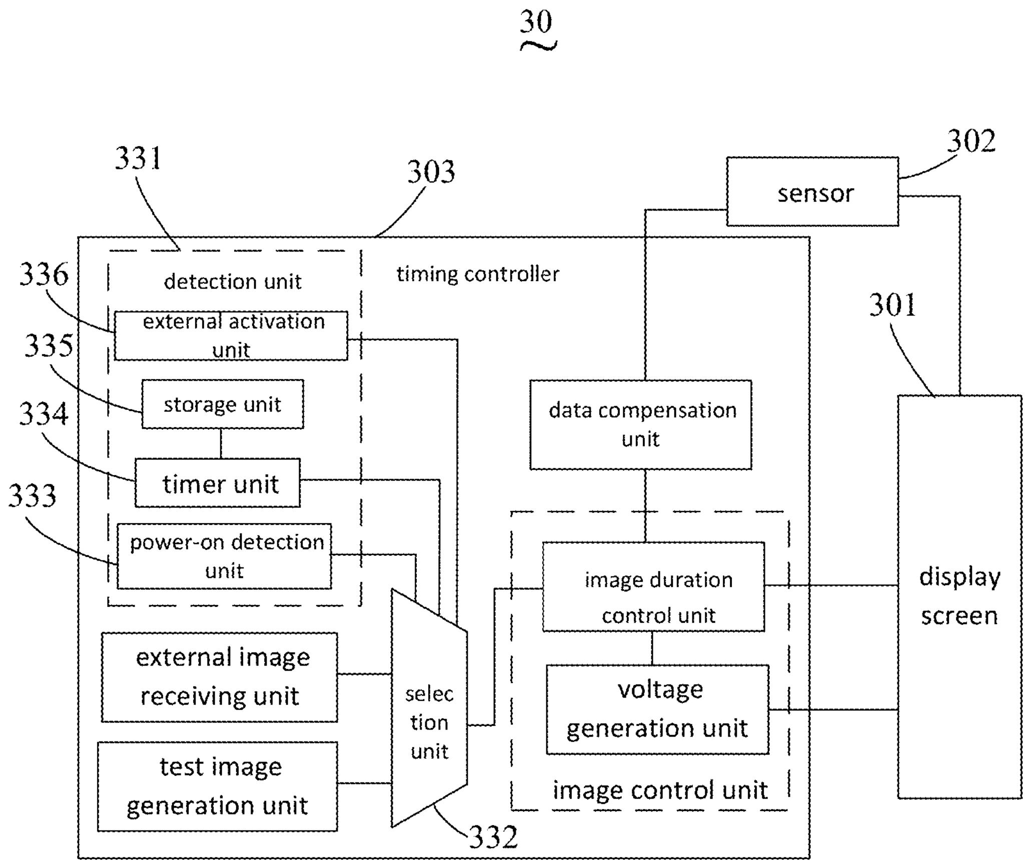
FIG. 3 is a schematic view showing the structure of the third embodiment of an OLED display device according to the present invention.

Referring to FIG. 3, FIG. 3 is a schematic view showing the structure of the third embodiment of an OLED display device according to the present invention. The difference between the OLED display device 30 and the OLED display device 20 of FIG. 2 is that the OLED display device 30 of FIG. 3 further comprises an external activation unit.

As shown in FIG. 3, the OLED display device 30 still comprises a display screen 301, a sensor 302 and a timing controller 303. The timing controller 303 comprises a detection unit 331 and selection unit 332, wherein the detection unit 331, in addition to power-on detection unit 333, timer unit 334 and storage unit 335, also comprises an external activation unit 336, wherein the external activation unit 336 is connected to the selection unit 232.

In the instant embodiment, the external activation unit 336 provides command for generating test image after receiving instructions inputted by a user.

It should be noted that the priority of the command for generating test image provided by external activation unit 336 is higher than the command for generating test image provided by the timer unit 334. During the interval of two adjacent preset default times stored in the storage unit 335, when the external activation unit 336 receives instruction from a user, the external activation unit 336 provides command for generating test image; when the external activation unit 336 does not receive instruction from a user, the command for generating test image is provided by the timer unit 334 according to the default time.

Therefore, the OLED display device 30 of the present embodiment not only provides test image when turned on, but also can provide test image according to the default time after turned on as well as provide test image on user instruction to re-detect the decay of OLED display device 30 so that the OLED display device 30 can execute detection any time. Therefore, the external image can be compensated in real time and the uneven display situation caused by decay of the OLED display device 30 as time passes can be improved.

Figure 4:
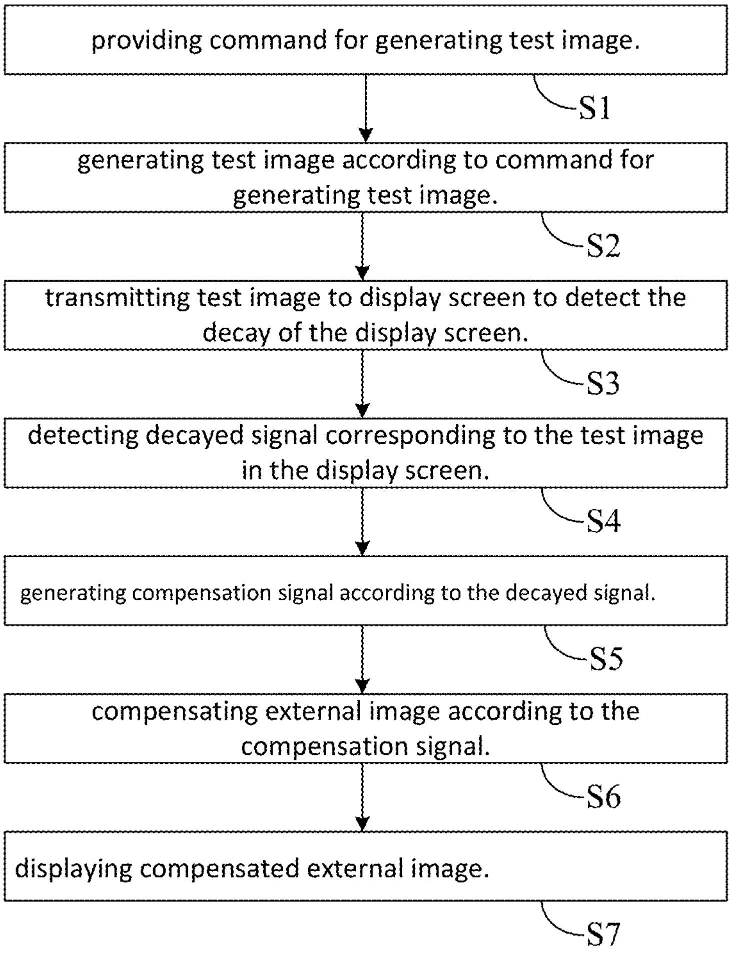
FIG. 4 is a flowchart of an embodiment of a control method of OLED display device according to the present invention.

Referring to FIG. 4, FIG. 4 is a flowchart of an embodiment of a control method of OLED display device according to the present invention, wherein the OLED display device comprises a display screen. As shown in FIG. 4, the control method of OLED display device comprises the following steps.

Step S1: providing command for generating test image.

Step S2: generating test image according to command for generating test image.

Step S3: transmitting test image to display screen to detect the decay of the display screen.

In step S3, before transmitting test image to display screen to detect the decay of the display screen, the method further comprises a step of storing in advance standard voltage signal or standard current signal corresponding to test image.

At the time of transmitting test image to display screen, a control voltage corresponding to the test image is also generated and the control voltage corresponding to the test image is transmitted to the display screen to control whether the test image is displayed in the display screen.

Step S4: detecting decayed signal corresponding to the test image in the display screen.

In step S4, decayed signal comprises decayed voltage signal and decayed current signal, wherein detecting decayed signal corresponding to the test image in the display screen is specifically to detect decayed voltage signal or decayed current signal corresponding to test image in display screen.

Step S5: generating compensation signal according to the decayed signal.

In step S5, generating compensation signal according to the decayed signal is specifically to determine the value of compensation signal according to the difference between the standard voltage signal stored in step S3 and the decayed voltage signal detected in step S4, or the difference between the standard current signal stored in step S3 and the decayed current signal detected in step S4.

Step S6: compensating external image according to the compensation signal.

In step S6, compensating external image according to the compensation signal is specifically to control the duration (that is, frequency) of each frame of the external image when entering display screen according to the compensation signal. Furthermore, a control voltage is generated according to the external image signal and the compensation signal, and the control voltage is transmitted to the display screen. Therefore, the duration of each frame of the external image when entering display screen and the control voltage of the external image are both controlled so that the external image can display normally in the display screen.

Step S7: displaying compensated external image.

Figure 5:
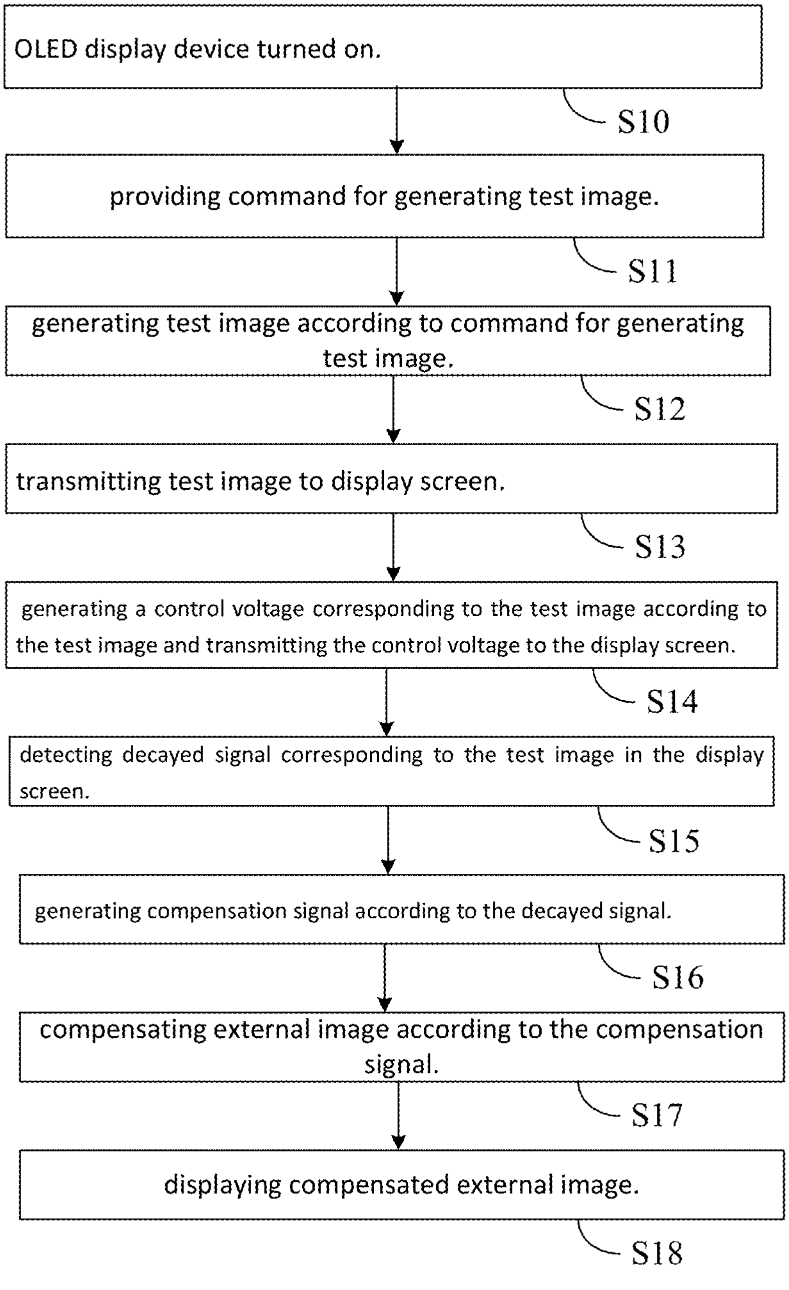
FIG. 5 is a flowchart of a specific control method of OLED display device according to the present invention.

Referring to FIG. 5, FIG. 5 is a flowchart of a specific control method of OLED display device according to the present invention. As shown in FIG. 5, the control method of OLED display device according to the present invention comprises specifically the following steps.

Step S10: OLED display device turned on.

Step S11: providing command for generating test image.

Step S12: generating test image according to command for generating test image.

Step S13: transmitting test image to display screen.

Step S14: generating a control voltage corresponding to the test image according to the test image and transmitting the control voltage to the display screen.

Step S15: detecting decayed signal corresponding to the test image in the display screen.

Step S16: generating compensation signal according to the decayed signal.

Step S17: compensating external image according to the compensation signal.

Step S18: displaying compensated external image.

Therefore, the control method of OLED display device of the instant embodiment is specifically to provide test image to detect the decay of the OLED display device each time the OLED display device is turned on. As such, the external image can be compensated in real time and the uneven display situation caused by decay of the OLED display device as time passes can be improved.

Figure 6:
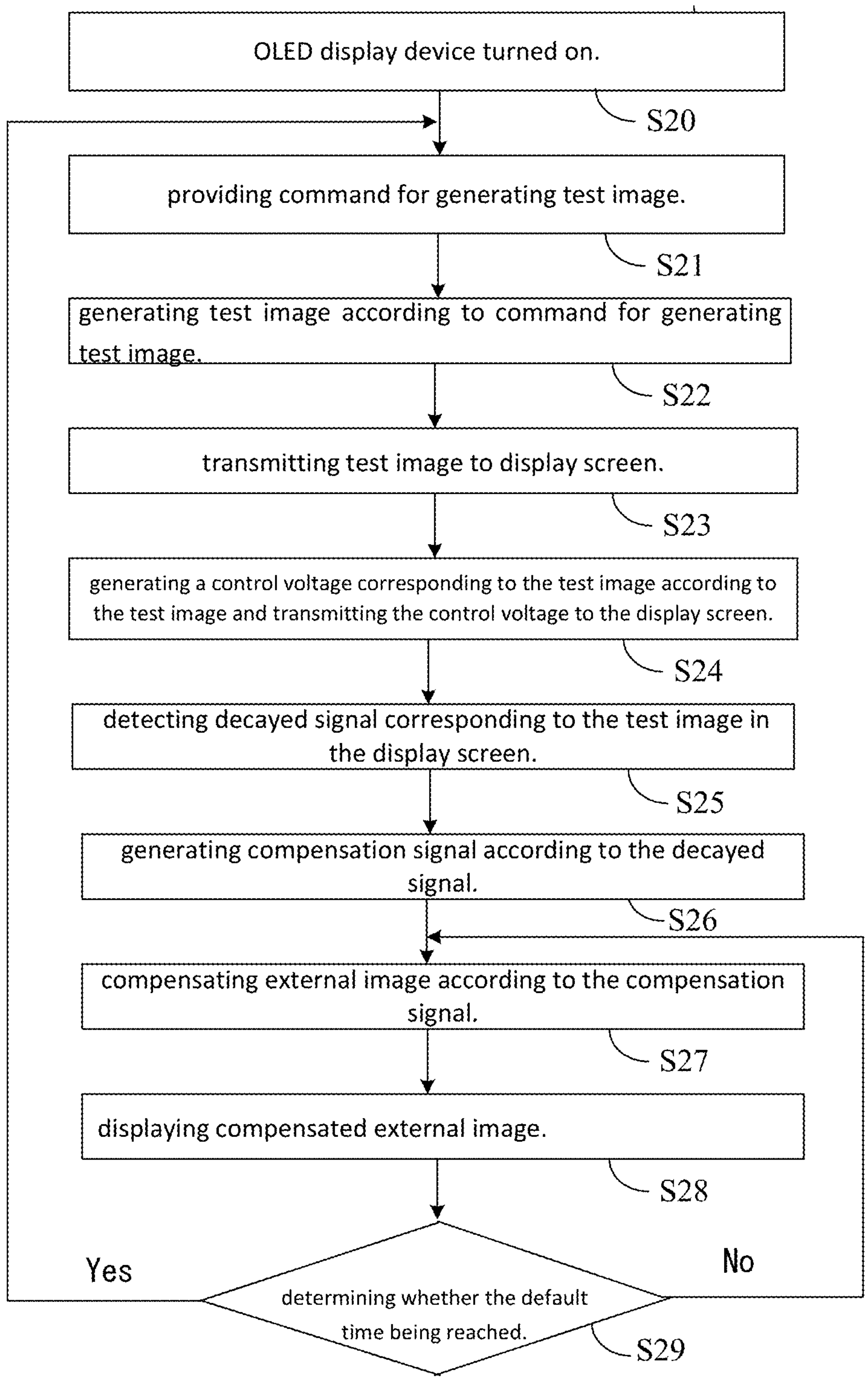
FIG. 6 is a flowchart of another specific control method of OLED display device according to the present invention.

Referring to FIG. 6, FIG. 6 is a flowchart of another specific control method of OLED display device according to the present invention. As shown in FIG. 6, the control method of OLED display device according to the present invention comprises specifically the following steps.

Step S20: OLED display device turned on.

Step S21: providing command for generating test image.

Step S22: generating test image according to command for generating test image.

Step S23: transmitting test image to display screen.

Step S24: generating a control voltage corresponding to the test image according to the test image and transmitting the control voltage to the display screen.

Step S25: detecting decayed signal corresponding to the test image in the display screen.

Step S26: generating compensation signal according to the decayed signal.

Step S27: compensating external image according to the compensation signal.

Step S28: displaying compensated external image.

Step S29: determining whether the default time being reached.

In step S29, if the default time is reached, the method returns to step 21; otherwise, the method returns to step S27. Specifically, when the default time is reached, the method returns to step 21 to provide command for generating test image to re-detect the OLED display device; otherwise, the method returns to step S27 to continue compensating the external image by using the previous compensation signal detected in OLED display device, wherein the default time is preset and stored.

As such, the control method of OLED display device in FIG. 6 is to perform re-detection of the OLED display device when the default time is reached after the control method of FIG. 5. In addition to providing test image to OLED display for detection when the OLED display device is turned on, the method can provide test image according to the default time to re-detect the decay of OLED display device. Therefore, the external image can be compensated in real time and the uneven display situation caused by decay of the OLED display device as time passes can be improved.

Figure 7:
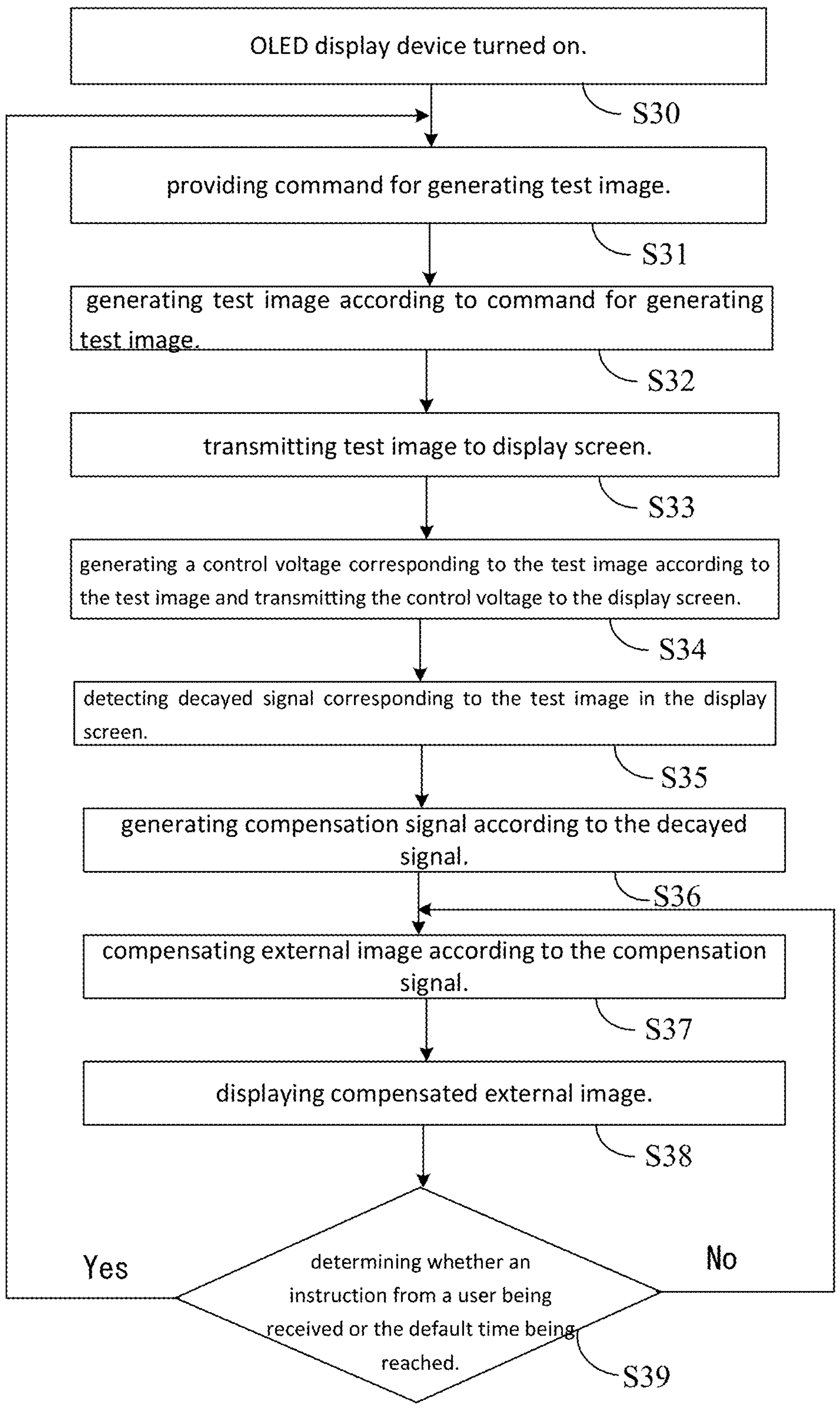
FIG. 7 is a flowchart of yet another specific control method of OLED display device according to the present invention.

Referring to FIG. 7, FIG. 7 is a flowchart of yet another specific control method of OLED display device according to the present invention. As shown in FIG. 7, the control method of OLED display device according to the present invention comprises specifically the following steps.

Step S30: OLED display device turned on.

Step S31: providing command for generating test image.

Step S32: generating test image according to command for generating test image.

Step S33: transmitting test image to display screen.

Step S34: generating a control voltage corresponding to the test image according to the test image and transmitting the control voltage to the display screen.

Step S35: detecting decayed signal corresponding to the test image in the display screen.

Step S36: generating compensation signal according to the decayed signal.

Step S37: compensating external image according to the compensation signal.

Step S38: displaying compensated external image.

Step S39: determining whether an instruction from a user being received or the default time being reached.

In step S39, if an instruction from a user is received or the default time is reached, the method returns to step 31; otherwise, the method returns to step S37. Specifically, when an instruction from a user is received or the default time is reached, the method returns to step 31 to provide command for generating test image to re-detect the OLED display device; otherwise, the method returns to step S37 to continue compensating the external image by using the previous compensation signal detected in OLED display device.

It should be noted that during two adjacent default times, if an instruction from a user is received, the method returns to step S31 to provide command for generating test image to re-detect the OLED display device; if no instruction from a user is received, the method returns to step S31 according to default time to provide command for generating test image to re-detect the OLED display device.

In the instant embodiment, the default time is preset and stored.

As such, the control method of OLED display device in FIG. 7 is to perform re-detection of the OLED display device when an instruction from a user is received on the basis of the control method of FIG. 6. In addition to providing test image to OLED display for detection when the OLED display device is turned on, the method can provide test image according to the default time or an instruction from a user to re-detect the decay of OLED display device. Therefore, the external image can be compensated in real time and the uneven display situation caused by decay of the OLED display device as time passes can be improved.

In summary, the present invention provides command for generating test image when the OLED display device is turned on, and according to the command to generate test image to detect the decay in displayed image in the OLED display device and generates corresponding compensation signal to compensate external image. The present invention further provides re-detection to an OLED display device when a default time is reached or an instruction from a user is received. As such, the present invention can compensate external image in real time according to command for generating test image and to improve the uneven display situation caused by decay of OLED display device as time passes.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A control method of an organic light emitting diode (OLED) display device, which comprises a display screen, the control method comprises the following steps:

providing a command;

generating and supplying a test image according to the command;

transmitting and feeding the test image to the display screen to be displayed on the display screen;

detecting the test image displayed on the display screen and generating and supplying a decayed signal corresponding to the test image displayed on the display screen;

generating a compensation signal according to the decayed signal;

receiving and compensating an external image according to the compensation signal to generate a compensated external image; and displaying the compensated external image;

wherein the test image, the decayed signal generated and supplied corresponding to the test image display on the display screen, and the external image are individually and independently fed to a selector and the test image, the decayed signal, and the external image are supplied from separate signal sources that are individually and independently connected to the selector that is further connected to a controller.

2. The control method as claimed in claim 1, wherein the command is provided when the OLED display device is turned on.

3. The control method as claimed in claim 1, wherein a default time period is preset and stored and the command is provided according to the default time period.

4. The control method as claimed in claim 1, wherein a test is performed to determine whether an instruction inputted by a user is received and if so, the command is provided.

5. The control method as claimed in claim 1 further comprising a step of storing in advance a standard voltage signal or a standard current signal corresponding to the test image before the test image is transmitted to the display screen.

6. The control method as claimed in claim 5, wherein the step of generating and supplying a decayed signal corresponding to the test image displayed on the display screen comprises detecting a decayed voltage signal or a decayed current signal corresponding to the test image displayed on the display screen; and the step of generating a compensation signal according to the decayed signal comprises determining a value of the compensation signal according to a difference between the standard voltage signal and the decayed voltage signal, or a difference between the standard current signal and the decayed current signal.

* * * * *